United States Patent [19]

Moore

[11] Patent Number: 4,960,354
[45] Date of Patent: Oct. 2, 1990

[54] HEADED FASTENER RETAINER CLIP

[76] Inventor: Richard B. Moore, 636 Wellington Cresent, Mount Clemens, Mich. 48043

[21] Appl. No.: 450,041

[22] Filed: Dec. 13, 1989

[51] Int. Cl.⁵ .............................................. F16B 21/18
[52] U.S. Cl. ..................................... 411/523; 403/397
[58] Field of Search ............... 411/522, 523, 524, 525; 403/261, 397

[56] References Cited

U.S. PATENT DOCUMENTS

| | | | |
|---|---|---|---|
| 1,752,544 | 4/1930 | Sparrow | 411/523 |
| 3,189,077 | 6/1965 | Willis, Jr. et al. | 411/523 |

FOREIGN PATENT DOCUMENTS 3243239  5/1984  Fed. Rep. of Germany ...... 411/523

*Primary Examiner*—Neill R. Wilson
*Attorney, Agent, or Firm*—Barnes, Kisselle, Raisch, Choates, Whittemore & Hulbert

[57] ABSTRACT

A clip for retaining a headed fastener in a hole in a plate. The clip is a U-shaped strip of flexible, resilient material with legs for engaging opposite sides of the plate. One leg has a clearance hole for the head of the pin and the other leg has a clearance slot for the shank of the pin. The leg with the head clearance has a tab which overlies the head of the pin to retain the pin in the hole.

3 Claims, 1 Drawing Sheet

HEADED FASTENER RETAINER CLIP

This invention relates generally to retainer clips and more particularly to a clip for retaining a fastener with a shank and head such as a pin or bolt in a hole in a plate.

BACKGROUND

Retainer clips made in the past have in general been difficult to install and remove, thereby increasing labor costs and often requiring special tools. Some clips could be removed only by cutting them off or by cutting the fastener itself for removal. When installing some retainer clips, they scrape and dig or cut into the shank of the fastener thereby defacing it and removing any protective finish or coating applied thereto to provide corrosion resistance. Some retainers require a hole through the shank or an annular groove in it which decreases the strength of the fastener, increases its cost by requiring additional machining operations and requires a greater overall length which increases its weight and cost. Other fasteners are permanently retained by having a portion upset or deformed after being assembled which increases assembly and tooling costs and results in destruction of the fastener and/or assembly when removed. Most retainers are designed for a specific size fastener, require close tolerances, and will not accommodate a broad range of fastener sizes.

SUMMARY

The retainer clip of this invention, on the other hand, can be installed and removed quickly and easily, without requiring special tools. This retainer clip is a single strip of flexible resilient material bent into the shape of a U to provide spaced apart legs integrally connected by a bight and adapted to engage over the edge of a plate with the legs embracing the plate hole. One of the legs has a clearance for the shank of the pin and the other leg has a clearance for the head of the pin.

The clearance for the shank of the pin preferably is a slot which extends through the free end of the leg remote from the bight. The clearance for the head of the pin preferably is an opening or hole completely surrounded by leg material.

The leg having the head clearing opening is provided with a tab having a retainer portion which is adapted to overly the head of the pin. This tab is preferably integrally connected to the leg at one edge of the opening and the retainer portion preferably extends across at least the major portion of the opening. The opening may be formed by punching out or otherwise displacing leg material, and the tab may be formed of the displaced material.

Preferably the clip has an inclined entry lip along the marginal edge of the leg with the tab to facilitate engagement of the pin retainer clip over both the edge of the plate and the head of the pin. To facilitate firm engagement of the clip with the plate and use with plates of varying thickness, preferably the legs converge in a direction away from the bight at an angle between 0° and 5° and preferably about 3°.

Objects, features and advantages of this invention are to provide a retainer clip which can be quickly and easily installed and removed, does not require special tools to do so, can be installed manually without any tools, after removal can be reused, does not scrape, deface or damage the fastener, will accommodate a broad range of fastener sizes, not require close tolerance to function properly, can be used with plates of varying thickness can be made with little scrap material, and is of simplified design and economical manufacture, installation and removal.

BRIEF DESCRIPTION OF THE DRAWINGS

These and other objects, features and advantages will be apparent from the following detailed description, appended claims and accompanying drawings in which

DETAILED DESCRIPTION

Figure 1:
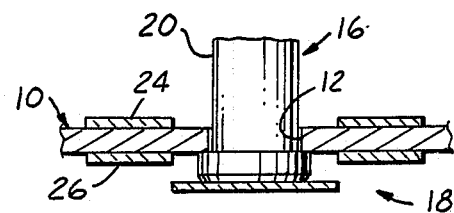
FIG. 1 is an exploded perspective view showing the clip of this invention in association with a plate and a headed pin adapted to be inserted in one of the holes in the plate.

Referring now more particularly to the drawings, FIG. 1 illustrates a flat plate 10 having a plurality of spaced apart circular holes 12 near one edge 14 thereof. A pin 16 is assembled to the plate by inserting it into one of the plate holes and retained therein by a clip 18 engageable over the edge 14 of the plate to hold the pin therein.

The pin 16 has an elongated cylindrical shank 20 and an enlarged head 22 at one end of the shank. The diameter of the shank is slightly less than the diameter of the holes so that the shank can be easily inserted endwise into one of the plate holes. The diameter of the head 22 is larger than the diameter of the holes so that when the shank of the pin is fully inserted in a plate hole, the head abuts the surface of the plate surrounding the hole.

The clip 18 is formed from an initially flat, relatively thin, single length or strip of flexible resilient material such as SAE 1050 spring steel. This strip of material is formed into the shape of a U to provide spaced apart legs 24 and 26 integrally connected by a return bend or bight 28. To facilitate forming the bight 28 preferably a rectangular hole is punched through the flat strip before it is bent into a U shape to form the bight with a notch 27 therein.

The leg 24 is flat or planar and bifurcated with two laterally spaced apart, parallel fingers 29 and 30 having parallel side edges 31 and 32 and extending away from the bight 28. The free ends of the side edges 31 and 32 are connected by a transverse edge 34 which is parallel to the bight 28 and is interrupted at the midpoint in its length by a slot 36. The slot 36 provides clearance for the shank 20 of pin 16.

The slot 36 has laterally spaced apart side edges 38 and 39 which are parallel to the side edges 31 and 32 of the clip and equally spaced therefrom. The slot at its end nearest the bight 28 is closed by an arcuate edge portion 40. The opposite or outer end of the slot extends through the transverse edge 34. The width of the slot measured between its side edges 38 and 39 is slightly greater than the diameter of the shank 20 of pin 16.

The leg 26 is flat or planar, except for a tab 41 and a lip 42, described more fully hereinafter. The leg 26 has laterally spaced apart, parallel side edges 44 and 46 which extend away from the bight 28 at right angles thereto. The outer ends of the side edges 44 and 46 are connected by a transverse edge 48 which is parallel to the bight 28.

To provide clearance for the head of the pin, the leg 26 is formed with an opening 50. The opening is formed entirely inside the edges 44, 46 and 48 and the bight 28 and is completely surrounded by the material of the leg 26. The opening 50 is formed by punching out or otherwise displacing material of the leg 26, the displaced material constituting the tab 41.

The tab 41 has an end portion 52 integrally connected to the edge of the opening 50 adjacent the bight 28, and a head retaining portion 54. The head retaining portion 54 is disposed outwardly of the leg 26, preferably substantially parallel to the leg, and at least partially overlying the opening 50. Preferably the head retainer portion 54 of the tab extends from its end portion 52 across the major portion of the opening 50. Preferably, the transverse distance between the inner faces of the retainer portion 54 and the leg 26 is substantially equal to the thickness of the pin head 22.

To facilitate engagement of the clip over the edge of the plate 10, the free end of the leg 26 has an outwardly inclined or flared entry lip 42. This lip also facilitates sliding the free end of the leg 26 over the head of the pin.

Preferably, the legs 24 and 26 converge in a direction away from the bight 28 at an angle between 0° and 5°, preferably about 3°. Usually the clip is designed so that the distance between the legs 24 and 26 adjacent the bight 28 is slightly greater than the thickness of the plate 10. The free ends of the legs 24 and 26 in the relaxed or unflexed condition of the clip, will normally be spaced apart somewhat less than the plate thickness so that the clip is flexed and under a degree of stress when received over the edge of the plate to urge the legs into firm frictional engagement with the plate.

Figure 3:
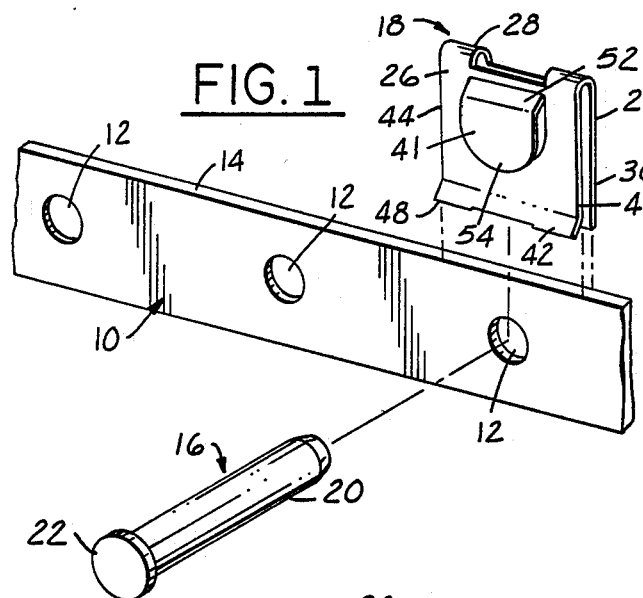
FIG. 3 is a sectional view taken on the line 3—3 in FIG. 2.
Figure 2:
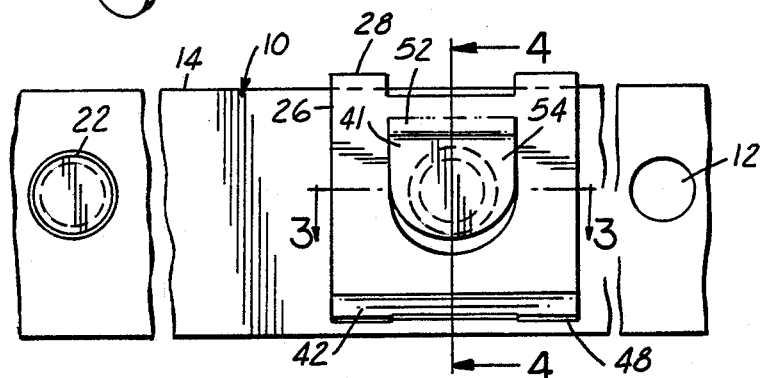
FIG. 2 is a side view with parts broken away showing the retainer clip engaged over the edge of the plate to retain a headed pin inserted in a plate hole.

In use, and with the pin 16 fully inserted in a plate hole 12 with its head 22 abutting the surface of the plate 10 surrounding the hole, the clip 18 is manually engaged over the edge 14 of the plate by simple hand force. During the initial application, the flared lip 42 of leg 26 will cam over the edge 14 of the plate and then over the head 22 of the pin. See the dotted line flexed position shown in FIG. 4. As the clip reaches the fully applied position, the flexed leg 26 snaps over the head 22 of the pin and the opening 50 in leg 26 receives the head and prevents the clip from being accidentally removed. In the fully applied position (FIGS. 2–4) the tab 41 at least partially overlies the pin head 22 to retain the pin 16 in the plate. The slot 36 clears the shank 20 of the pin 16 both during application of the clip and in the fully applied position. The fingers of the leg 24 also facilitate retention of the clip on the pin and plate. In the fully applied position, the pin is retained in the plate and the clip is releasably retained on the plate.

Figure 4:
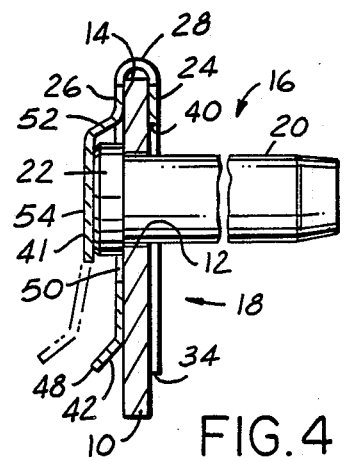
FIG. 4 is a sectional view taken on the line 4—4 in FIG. 2.
Figures 5, 6, 7:
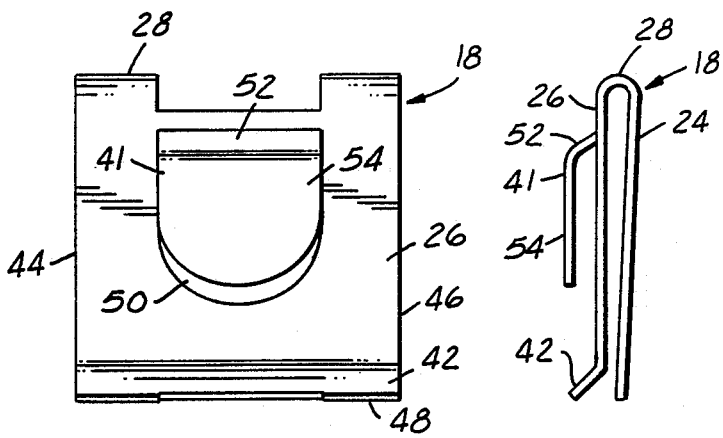
FIG. 5 is a view of one side of the clip.
FIG. 6 is an edge view of the clip.
FIG. 7 is a view of the opposite side of the clip.
Figure 8:
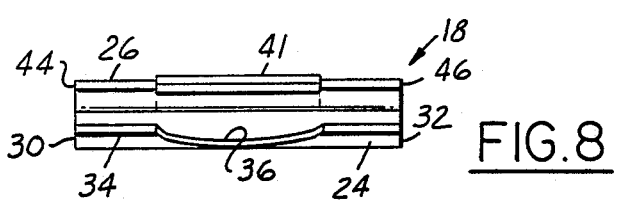
FIG. 8 is an end view of the clip.

The clip can be manually removed quickly and easily by first lifting the leg 26 to the dotted line position in FIG. 4 so that the opening 50 clears the head and then pushing or pulling the clip away from or off the plate. If desired the clip can be removed by inserting the blade of a screw driver under the lip 42 to both lift the leg 26 and urge the clip off the plate.

What is claimed is:

1. A retainer clip for retaining a fastener having a head and a shank in a hole in a plate comprising: a single U-shaped strip of flexible resilient material having first and second legs integrally connected by a bight and adapted to engage over the edge of the plate with said first and second legs embracing the plate hole, said first leg having a first clearance for the shank of the fastener extending through the plate hole and said second leg having a second clearance for the head of such fastener, said first leg having laterally spaced apart side edges and a transverse edge opposite said bight, said first clearance comprising a slot between said side edges extending through said transverse edge and having a width greater than that of the shank of the fastener, said second leg having laterally spaced apart side edges and a transverse edge opposite said bight, said second clearance comprising an opening spaced inwardly of said bight and said side and transverse edges of said second leg and completely surrounded by the material of said second leg, said second leg having a tab, said tab having a retainer portion substantially parallel to and spaced outwardly of said second leg and overlying at least part of said opening and the head of the fastener received therein, said tab having an end portion integrally connected to the edge of said opening adjacent said bight, said retainer portion of said tab extending from said end portion thereof across at least the major portion of said opening, said opening in said second leg being formed by the displacement of a portion of the material thereof and said tab being formed of such displaced material.

2. The retainer clip defined in claim 1, wherein said legs extend in a direction away from said bight at an angle to one another of about 0° to 5°.

3. The retainer clip defined in claim 1, wherein said legs extend away from said bight and angle to one another of about 3°.

* * * * *